(12) United States Patent
Marchon et al.

(10) Patent No.: US 11,798,598 B1
(45) Date of Patent: Oct. 24, 2023

(54) HARD DISK DRIVE WITH LOW DENSITY ATMOSPHERE

(71) Applicant: Seagate Technology LLC, Fremont, CA (US)

(72) Inventors: Bruno Marchon, Palo Alto, CA (US); Dipeshkumar Jayantilal Purani, Shakopee, MN (US); Tae Young Kim, Lafayette, CO (US); Huazhou Lou, Eden Prairie, MN (US)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 17/587,332

(22) Filed: Jan. 28, 2022

(51) Int. Cl.
  *G11B 33/14* (2006.01)
  *G11B 33/02* (2006.01)

(52) U.S. Cl.
  CPC ........ *G11B 33/1406* (2013.01); *G11B 33/022* (2013.01); *G11B 33/1486* (2013.01)

(58) Field of Classification Search
  None
  See application file for complete search history.

(56) References Cited

U.S. PATENT DOCUMENTS

| | | | |
|---|---|---|---|
| 4,556,969 A | 12/1985 | Teseder et al. | |
| 5,508,061 A * | 4/1996 | Yanagisawa | B05D 3/12 427/127 |
| 5,858,536 A * | 1/1999 | Yanagisawa | B05D 1/185 428/408 |
| 6,767,592 B2 * | 7/2004 | Gui | C23C 16/56 427/523 |
| 7,961,427 B2 | 6/2011 | Dorbeck et al. | |
| 8,279,552 B2 | 10/2012 | Stipe | |
| 8,885,287 B1 | 11/2014 | Koike et al. | |
| 8,908,319 B1 | 12/2014 | Gustafson et al. | |
| 9,536,572 B2 | 1/2017 | Lapp et al. | |
| 10,083,713 B1 * | 9/2018 | Simmons | G11B 5/40 |
| 10,957,363 B1 | 3/2021 | Brand | |
| 10,964,354 B1 * | 3/2021 | Turner | G11B 5/6088 |
| 2004/0021980 A1 * | 2/2004 | Albrecht | G11B 5/6005 |
| 2005/0094315 A1 | 5/2005 | Payne et al. | |
| 2006/0023354 A1 * | 2/2006 | Stipe | G11B 5/6064 |
| 2006/0256471 A1 | 11/2006 | Plumer et al. | |
| 2021/0210121 A1 * | 7/2021 | Turner | G11B 25/043 |
| 2021/0287719 A1 * | 9/2021 | Luebben | H05K 5/0217 |
| 2022/0148626 A1 * | 5/2022 | Luebben | H05K 5/0217 |
| 2022/0247064 A1 * | 8/2022 | Liu | G11B 33/148 |

FOREIGN PATENT DOCUMENTS

| | | | |
|---|---|---|---|
| JP | 3523602 B2 * | 4/2004 | |
| JP | 2006107607 A * | 4/2006 | G11B 5/187 |

OTHER PUBLICATIONS

Dai et al., "Toward an understanding of overcoat corrosion protection" IEEE Transactions on Magnetics, vol. 39, No. 5, Sep. 2003, pp. 2450-2452.

(Continued)

*Primary Examiner* — William J Klimowicz
(74) *Attorney, Agent, or Firm* — Kagan Binder, PLLC

(57) ABSTRACT

Described are hard disk drives that include a low density atmosphere, with which is included a passivating gas, and methods of using these hard disk drives and methods of assembling these hard disk drives.

17 Claims, 4 Drawing Sheets

(56) References Cited

OTHER PUBLICATIONS

Kim et al., "Humidity effects on lubricant transfer in the head-disk interface of a hard disk drive" Journal of Applied Physics, vol. 105, Issue No. 7, 078704-3 (2009); https://doi.org/10.1063/ 1.3061704.

Pathem et al.. "Carbon Overcoat Oxidation in Heat-Assisted Magnetic Recording" EEE Transactions on Magnetics, vol. 49 Issue 7, (Jul. 15, 2013) pp. 3721-3724.

Marchon et al., "The Head-Disk Interface Roadmap to an Areal Density of 4 Tbit/in2" Hindawi Publishing Corporation, Advances in Tribology, (2013) 8 pages, http://dx.doi.org/10.1155/2013/521086.

Marchon et al., "TPD and XPS Studies of 02, C02, and H20 Adsorption on Clean Polycrystalline Graphite" Carbon vol. 26. No. 4. (1988) pp. 507-514.

Marchon et al., "Evidence for tribochemical wear on amorphous carbon thin films" IEEE Transactions on Magnetics, vol. 26. No. 1, Jan. 1990, pp. 168-170.

Petit et al., "Early stages of surface graphitization on nanodiamond probed by x-ray photoelectron spectroscopy" Phys. Rev. B 84, (2011) pp. 233407-5.

Marchn et al., "Magnetic Spacing Trends: From LMR to PMR and Beyond" IEEE Transactions on Magnetics, vol. 45, No. 10, Oct. 2009, pp. 3608-3611.

Sh. Michaelson et al., "Dissociative adsorption of molecular deuterium and thermal stability onto hydrogenated, bare and ion beam damaged poly- and single crystalline diamond surfaces" Surface Science 642 (2015) pp. 16-21.

Wikipedia, "Kinetic diameter", https://en.wikipedia.org/wiki/Kinetic_diameter, viewed on Dec. 2021.

* cited by examiner

HARD DISK DRIVE WITH LOW DENSITY ATMOSPHERE

FIELD

The invention relates to hard disk drives that include a low density atmosphere, with which is included a passivating gas, and also to methods of using these hard disk drives and methods of assembling these hard disk drives.

BACKGROUND

A hard disk drive (HDD) is a device that is useful for storing digital information in a computer-useable format. The digital information is recorded on one or more planar, round, rotating surfaces of magnetic recording media commonly referred to as discs, disks, or platters. The hard disk drive stores and retrieves the magnetically-recorded digital information onto and from the rapidly-spinning magnetic recording disks. Different versions of hard disk drives exist, including those that operate by a "heat-assisted magnetic recording" (HAMR) mechanism, and those that operate by a "perpendicular magnetic recording" mechanism, among others.

A hard disk drive includes electrical and mechanical components that typically include a head disk assembly (HDA), a printed circuit board assembly (PCBA), a head stack assembly (HSA), as well as others. These components are arranged within an interior space of an enclosed and typically sealed housing that is made of a sturdy base and a cover that together enclose the interior space. The housing may be sealed hermetically to prevent any form of contaminant or gas to pass between the interior and exterior of the sealed housing.

In operation of the hard disk drive to record or read data relative to the magnetic disk, each magnetic head is supported above a surface of a rotating disk. Correct positioning of a magnetic head relative to the disk surface is important for proper reading and writing from the disk, and must be controlled precisely. A magnetic head is distanced from the surface by a cushion of gas moving past the magnetic head, and which is caused by the spinning disks. The magnetic head, in the stream of moving gas, is suspended above the magnetic disk surface in a manner that is described as the head "flying" over the disk surface.

To enhance performance of a hard disk drive, the gas at the interior of a sealed hard disk drive may be a low density gas, relative to air. A low density gas atmosphere such as a helium atmosphere significantly reduces aerodynamic drag between the spinning disks and an associated magnetic head, compared to friction caused by an air interior. The reduction in drag experienced by the disk and magnetic head reduces the amount of power needed to rotate the magnetic disks, and a helium-filled hard disk drive requires substantially less power than a comparable air-filled hard disk drive. The reduced density also reduces disk flutter, which allow for thinner disk to be used. Additionally, a concentrated helium atmosphere conducts heat more effectively than air. The helium-filled hard disk drive removes heat that is generated at the disk drive interior more efficiently than an air-filled disk drive, resulting in a lower operating temperature at the interior of the helium-filled drive.

Another feature of many commercial hard disk drives is a protective coating at a surface of a magnetic disk, a magnetic head, or both. A protective coating may be placed on a component surface of a hard disk drive to reduce wear or mechanical damage at the surface of the coated item, or to act as gas barrier to prevent diffusion of gas to locations below the surface.

SUMMARY

Amorphous carbon coatings can have the potential to create debris at an interior of a hard disk drive in the form of a carbonaceous material that becomes present at a disk surface or a surface of a magnetic recording head. See Assignee's U.S. Pat. No. 10,964,354 and United States Patent application Publication 2021/0210121, the contents of these documents being incorporated herein by reference.

Described as follows are novel and inventive hard disk drives that contain an amorphous carbon surface, and a low density atmosphere with a passivating gas for passivating the amorphous carbon surface, i.e., for passivating carbon dangling bonds that form at the amorphous carbon surface during use of the hard disk drive, and related methods.

In one aspect, the invention relates to a hard disk drive that includes: a sealed enclosure and a magnetic recording device disposed within the enclosure. The device includes: a magnetic recording medium surface, a magnetic head, and an amorphous carbon surface, and a low density atmosphere within the enclosure, the atmosphere containing a low density gas and up to 5 percent (by volume) passivating gas that is effective to passivate carbon dangling bonds that form at the amorphous carbon surface during use of the hard disk drive.

In another aspect, the invention relates to a method of using a hard disk drive as described herein. The method includes: writing data magnetically to the magnetic recording media using the magnetic head, and reading the data using the magnetic head.

In yet another aspect, the invention relates to a method of assembling a hard disk drive. The method includes: to a hard disk drive comprising a sealed enclosure, a magnetic recording device disposed within the enclosure, with the magnetic recording device comprising: a magnetic recording media surface, a magnetic head, and an amorphous carbon surface; adding a gaseous low density atmosphere to the enclosure, the gaseous low density atmosphere including a low density gas and up to 5 percent (by volume) passivating gas that is effective to passivate carbon dangling bonds that can be produced at the amorphous carbon surface during use of the hard disk drive.

Figure 1:
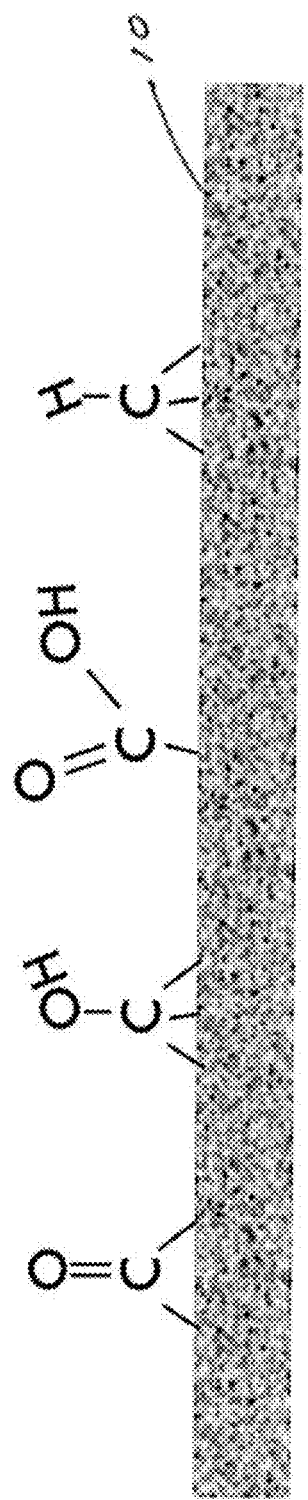
FIG. 1 is a schematic depiction of an amorphous carbon surface with non-carbon moieties present at the surface.

All figures are schematic and not necessarily to scale.

DETAILED DESCRIPTION

A hard disk drive includes electronic and mechanical components contained in a carefully controlled environment of a sealed enclosure. Basic structures of a disk drive include a magnetic recording medium such as one or more magnetic hard disks disposed within the enclosure; one or more magnetic heads that include one or more transducers for writing or reading magnetically-recorded data relative to the magnetic hard disk; and electrical and mechanical components that manage the operation of magnetic disks and magnetic heads to allow the drive to function to store and retrieve magnetically-recorded digital information.

Various types of magnetic recording mechanisms are used in hard disk drive products. Example types include longitudinal magnetic recording (LMR), perpendicular magnetic recording (PMR), shingled magnetic recording (SMR), and heat assisted magnetic recording (HAMR). A heat-assisted magnetic recording mechanism may be used in conjunction with an LMR, PMR, or SMR technique, to achieve higher areal storage density. A hard disk drive as described may include any of these types of recording mechanisms.

The electrical and magnetic components of disk drives are highly developed and include very small, high-precision structures that exist and perform at very small-scale dimensions. One component is a magnetic head that is adapted to write or read (or both) magnetically-recorded data to and from a magnetic recording disk. A magnetic recording head (or "magnetic head") of the present description is a microelectronic component of a hard disk drive that during use is positioned above a spinning magnetic disk (a type of "magnetic recording medium"), at which position the magnetic recording head can write or read data onto or from the disk. Example magnetic heads include at least one transducer that can sense a magnetic field and convert the field into an electrical current (a "read transducer"), and at least one transducer that can transform electrical current into a magnetic field that can magnetically record data onto the disk (a "write transducer").

The magnetic head can be included as a component of a larger component of a hard disk drive, referred to as a "slider." A slider is a microelectronic device that includes one or more magnetic read and write transducers and that additionally includes an air-bearing surface (ABS) that causes the magnetic head to "fly" slightly above a surface of a spinning disk, buoyed by a layer of moving air between the spinning disk surface and the air-bearing surface. A close distance between the magnetic head and the magnetic recording disk surface can increase the amount of data that can be stored on and retrieved from the disk. But that distance should also be large enough to avoid contact between the head and the disk surface during operation of the hard disk drive.

A hard disk drive contains a sealed interior space that includes a gaseous atmosphere that during operation flows past the air-bearing surface of a magnetic recording head due to the movement of the disk past the air-bearing surface in the fluid environment. To achieve certain advantages such as reduced aerodynamic drag between the rotating disk and the gaseous atmosphere within the hard disk drive, improved heat transfer, or both, the gaseous atmosphere may comprise a low density gas atmosphere, such as an atmosphere that includes a concentrated level of helium, having a density that is substantially lower than the density of air. The interior may contain a concentrated amount of a low-density gas such as helium, e.g., at least 90, 92, 95, 98, or 99 percent low-density gas (e.g., an inert gas such as helium or argon) based on volume. The spinning disk causes movement of the low-density gas at the disk surface, and the moving gas flows past the air-bearing surface of the magnetic recording head to produce specific forces on various surfaces of the air-bearing surface. Desirably, the moving gas flows past the air-bearing surface to cause a desired fly height and stability of the magnetic head during use.

The operating components of the disk are enclosed in an interior of a hard disk drive housing, which is formed between a base and a cover. Example interiors are hermetically sealed to prevent gas or gaseous contaminants from passing into or out of the hard disk drive interior. A drive that is hermetically sealed refers to a seal that is sufficiently airtight that an internal pressure within the drive is substantially independent of the external or ambient pressure. Alternately, example hermetically-sealed housings allow for not more than a very low rate of leakage from the interior to an exterior of the housing, for example a rate of leakage that is less than 1 percent of a volume of atmosphere (gas) present within the enclosure per year. Examples of hard disk drives that include a base and a cover and that are hermetically sealed to contain a low density atmosphere are described in U.S. Pat. Nos. 8,279,552 and 9,536,572,the entireties of which are incorporated herein by reference.

For any of various reasons, a surface of a component of a hard disk drive (e.g., a magnetic head or a surface of a magnetic recording medium, or both) may include a very thin protective coating at a surface. An example is an amorphous carbon coating, sometimes applied to a surface of a hard disk drive as a protective "hardcoat" layer. An amorphous carbon coating may be placed onto a surface of a magnetic head or a magnetic recording disk surface for a purpose of: preventing mechanical damage or wear to the surface, preventing exposure of the surface to the gaseous atmosphere at the interior of the hard disk drive (and any gaseous contaminants therein), or both.

The term "amorphous carbon" is used in the present description in a manner that is consistent with the meaning of this term in the chemical, materials, material coating, and microelectronic device manufacturing arts. Consistent therewith, amorphous carbon is considered to be a structure that is made substantially, entirely, or almost entirely of carbon atoms bound together in a substantially non-crystalline, amorphous structure, optionally with a lesser amount of hydrogen atoms. A preferred amorphous carbon material can contain a high amount of carbon atoms, but may possibly contain lesser or minor amounts of other atomic elements or chemical moieties, such as non-carbon chemical moieties chemically attached to a small number of carbon atoms at a surface of the amorphous carbon material, or non-carbon elemental impurities contained in the amorphous carbon material.

An amorphous carbon coating applied to a surface of a recording disk may contain essentially only carbon and hydrogen atoms, including up to 20 or 30 percent hydrogen atoms (on an atomic basis).

An amorphous carbon coating of a recording head may contain almost entirely (approximately one-hundred percent) carbon atoms and only a small amount of hydrogen or non-hydrogen impurities, e.g., a total amount of hydrogen and non-hydrogen impurities that is less than 1, 0.5, 0.1, or 0.01 atomic percent of an amorphous carbon material.

Also, while amorphous carbon is substantially non-crystalline, as is typical with other amorphous solids, some short-range crystallinity or structured atomic order may be present.

Amorphous carbon may be considered to exhibit certain properties that are known to be characteristic to amorphous carbon, that are different from characteristics of the other carbon allotropes: graphite and diamond. Amorphous carbon contains a significant or high amount of localized 7C electrons, as opposed to aromatic 7C bonds characteristic of graphite. Amorphous carbon may also contain a significant concentration of dangling bonds, which cause deviations in interatomic spacing (as measured using diffraction techniques) of more than five percent, as well as noticeable variation in bond angle. Additionally, a primary measure to characterize amorphous carbon is the relative amount of (or ratios of) sp2 to sp3 hybridized bonds that are present in the material. For comparison, graphite contains essentially all sp2 hybridized bonds, and diamond contains essentially all sp3 hybridized bonds. Materials that are high in sp3 hybridized bonds are referred to as tetrahedral amorphous carbon, owing to the tetrahedral shape formed by sp3 hybridized bonds, or as diamond-like carbon owing to the similarity of many physical properties to those of diamond. Experimentally, sp2 to sp3 ratios can be determined by comparing the relative intensities of various spectroscopic peaks (including EELS, XPS, and Raman spectroscopy) to those expected for graphite or diamond.

One example of a useful amorphous carbon material applied at a surface of a component of a hard disk drive is a coating of amorphous carbon known as "diamond-like carbon" or "DLC." Diamond-like carbon is a known material, sometimes referred to as "CVD diamond" (i.e., diamond deposited by chemical vapor deposition). Diamond-like carbon is a type or class of amorphous carbon materials that include those having certain mechanical or physical properties that are comparable to diamond, and that contain sp3 carbon-carbon interatomic bonds, or a mixture of sp2 and sp3 carbon-carbon interatomic bonds.

Diamond-like carbon can be deposited onto a substrate using any of various deposition methods, including chemical vapor deposition (CVD), plasma-enhanced chemical vapor deposition (PECVD), and physical vapor deposition (PVD), among others. Example diamond-like carbon coatings applied to a magnetic head may be deposited using a filtered cathodic arc (f-CAC) deposition technique to produce a high purity coating, such as a coating that contains at least 95, 98, 99, 99.9, or 99.99 percent (atomic) carbon atoms, to also result in nearly 100 percent sp3 bonds. Diamond-like carbon that is useful as a coating of a magnetic recording medium as described may be deposited by a plasma-enhanced CVD method (PECVD), and may contain up to 20 or up to 30 atomic percent hydrogen.

An amorphous carbon coating, e.g., a diamond-like carbon coating, can be applied to a surface of a magnetic recording disk or a magnetic head (e.g., at an air bearing surface), by any of a variety of known techniques, especially by vacuum deposition techniques that include physical vapor deposition, chemical vapor deposition, and the like. Examples of specific versions of deposition processes include methane-based chemical vapor deposition; acetylene-based chemical vapor deposition; pulsed, filtered, cathodic arc physical vapor deposition; among others. Each technique may produce an amorphous carbon structure and composition that differ from an amorphous carbon structure and composition deposited via a different technique (e.g., different sp2 and sp3 content, and hydrogen content).

An amorphous carbon coating applied to a magnetic head or a surface of a magnetic recording medium may have any useful thickness, which may often be on a scale of nanometers. Useful thickness ranges of an amorphous carbon coating for a magnetic head or a magnetic recording medium may be less than 50 nanometers, less than 20 nanometers, or less than 10 or less than 5 nanometers.

In the presence of gaseous moisture and oxygen, carbon materials, including crystalline (e.g., graphite) allotropes and amorphous carbon allotropes, can be populated with non-carbon surface chemical moieties such as hydroxyl, carbonyl, carboxyl, and carbon-hydrogen bonds. Examples of these chemical moieties are shown schematically at FIG. 1, which shows carbon surface 10 (e.g., diamond, graphite, DLC, etc.), with example chemical moieties attached chemically to carbon atoms at the amorphous carbon surface.

The non-carbon chemical moieties attached to carbon atoms at the surface of the amorphous carbon material act to stabilize the surface by saturating any carbon dangling bonds that might otherwise be present at the surface. If the carbon dangling bonds remain present and not stabilized by the non-carbon chemical moieties, the carbon bonds of two or more carbon atoms are capable of reacting to form a non-amorphous, e.g., crystalline graphite carbonaceous material that has properties that are different from and less desirable than the amorphous carbon. Thus, the non-carbon moieties have a stabilizing effect relative to the reactivity of surface carbon atoms that include a carbon dangling bond.

During operation of a hard disk drive, with high-speed sliding contact between a surface of a rotating disk and a surface of a magnetic head, at least one of which includes an amorphous carbon coating, a non-carbon chemical moiety can be removed from the surface (e.g., desorbed as a gaseous product (e.g., carbon dioxide)) to leave behind a carbon dangling bond. In the presence of oxygen or water, which may be contained in an atmosphere of air, the carbon dangling bond can react the oxygen or water vapor to re-form a passivating non-carbon moiety (e.g., carbonyl, hydroxy, or carboxylate), and the process repeats. While reactions between the carbon dangling bonds to form non-amorphous debris is reduced, repeated chemical reactions between surface carbon atoms and water or oxygen can lead to an atomic level chemical wear at the surface.

According to the present description, a passivating gas such as hydrogen can be included in a passivating amount as part of a low density, e.g., inert, preferably concentrated helium atmosphere of a hard disk drive. The passivating gas reacts with carbon dangling bonds at a surface of an amorphous carbon coating to passivate carbon atoms (particularly, carbon atoms that contain a carbon dangling bond) at the surface and, as a preferred result, reduces an amount of chemical wear at the surface or reduces an amount of carbonaceous (e.g., graphitic) debris that forms or accumulates at the surface during use of a hard disk drive as described.

The terms "dangling bond" and "carbon dangling bond" are used herein in a manner that is consistent with the meaning of these terms when used in the chemical and materials arts. Consistent therewith, a dangling bond is an unsatisfied valence on an immobilized carbon atom of an amorphous carbon material. Generally, an immobile atom (carbon or otherwise) with a dangling bond may also be referred to as an immobilized free radical or an immobilized radical, a reference to structural and chemical similarity to a free radical.

Without water or oxygen present in an atmosphere of a carbon dangling bond, e.g., in a vacuum or in an atmosphere of a concentrated or pure inert gas such as helium, no atmospheric gas molecules are present to react with and stabilize a carbon dangling bond. Carbon dangling bonds are free to react with each other in a manner that forms a carbonaceous material from the reacted and chemically-combined carbon atoms. The carbonaceous material may be graphitic (e.g., "graphite clusters," that are high in the graphite allotrope of carbon), and may form and collect at an amorphous carbon surface as carbonaceous debris.

Graphitic carbonaceous material (e.g., graphite clusters) exhibits low hardness and poor mechanical integrity, and forms weak portions within an otherwise durable amorphous carbon surface. The weak-portions can be locations of atomic-level wear at the surface. The carbonaceous debris that is worn from the surface can form carbonaceous, graphitic smear material (or "paste") that can accumulate at a surface of an amorphous carbon coating, either at a magnetic head or a magnetic recording medium surface. This type of solid carbonaceous debris is capable of reducing the performance of the hard disk drive by causing reading and writing errors or by otherwise reducing reliability or longevity of the device. Solid graphitic carbonaceous debris of this type may be detected by known, standard methods, such as by Raman Spectroscopy.

According to the present description, an amount of a passivating gas is combined with a concentrated amount of gaseous helium (or other inert or low density gas) to form a gaseous atmosphere within a sealed interior of a hard disk drive. The passivating gas is a gaseous chemical that when exposed to a carbon dangling bond of an amorphous carbon coating surface within an interior of a hard disk drive will passivate the surface, i.e., reduce the reactivity of the surface by chemically combining with the carbon dangling bond as a non-carbon chemical moiety attached to the carbon atom. The non-carbon moiety may be any moiety that is relatively more stable than the carbon dangling bond, with relatively more stable moieties such as a bonded hydrogen atom being preferred.

An example of a useful passivating gas is hydrogen gas ($H_2$), which can react at a carbon dangling bond to replace the carbon dangling bond with a significantly more stable carbon-hydrogen bond.

Still, while gaseous hydrogen is a useful and potentially preferred passivating gas for certain types of hard disk drives and amorphous carbon coatings, other gaseous compounds will also be useful to react with a carbon dangling bond at a surface of an amorphous carbon material to passivate (chemically stabilize) the surface and prevent wear at the site of carbon dangling bonds, and prevent formation of debris in the form of graphitic clusters at the surface.

Other useful gases may include hydrocarbons that are gaseous at room temperature. The hydrocarbon may be made of only hydrogen and carbon, or may include a heteroatom such as a nitrogen or an oxygen or a halogen atom, and may be saturated, unsaturated, straight, or branched. Examples include methane, ethane, ethylene, acetylene, propane, propene, propyne, butane, butene, butadiene and butyne; chemical derivatives thereof (alcohols, aldehydes, carboxylic acids, ketones, fluorides, chlorides etc.), including liquid hydrocarbons that have high enough vapor pressure e.g. 5 to 8 carbon-containing hydrocarbons. Small gaseous molecules that can also react to carbon surface dangling bonds include hydrogen chloride (HCl), hydrogen fluoride (HF), and Xenon Hexafluoride ($XeF_6$), although certain of these species may be less useful in the presence of corrosion-prone disk drive components.

An amount of the passivating gas within a low density atmosphere can be any amount that is useful to passivate an amount of carbon dangling bonds at a surface of an amorphous carbon coating as described, present within a hard disk drive, especially at a magnetic head, magnetic recording medium, or both. Because the reactivity of carbon dangling bonds is relatively high, only a relatively small amount of a passivating gas, e.g., below 5 percent (by volume) based on total gaseous atmosphere, may be necessary. Example concentrations of passivating gas in a hard disk drive atmosphere may be in a range from 0.1 to 5 percent (by volume), e.g., from 1 percent to 4 percent by volume, based on total volume of atmospheric gas in a hard disk drive.

A carbon dangling bond at a surface of an amorphous carbon material may react with various chemical compounds to form a range of various non-carbon moieties that can be present at a surface of an amorphous carbon material (see., e.g., FIG. 1). These include a carbonyl group, an hydroxy group, a carboxylate group, a hydrocarbon moiety, a bonded halide atom, and a bonded hydrogen atom.

Of these, a non-carbon moiety that exhibits a desirably high chemical stability is the hydrogen atom bonded directly to a carbon atom at the amorphous carbon surface through a carbon-hydrogen bond. A bond between hydrogen and carbon at a surface of amorphous carbon is considered to be stable at temperatures up to at least 700 degrees Celsius, making the hydrogen-passivated carbon dangling bond very stable, and is able to form at room temperature. Once formed to replace a carbon dangling bond, the carbon-bonded hydrogen will reduce or prevent the formation of soft graphitic surface clusters derived from the amorphous carbon surface at the site of the carbon dangling bond; the hydrogen bond formed from the carbon dangling bond therefore reduces wear that would otherwise occur at an amorphous carbon surface of a magnetic head or magnetic disk that includes the amorphous carbon coating, and reduces formation and accumulation of graphitic carbonaceous debris at the surface.

Figure 2A:
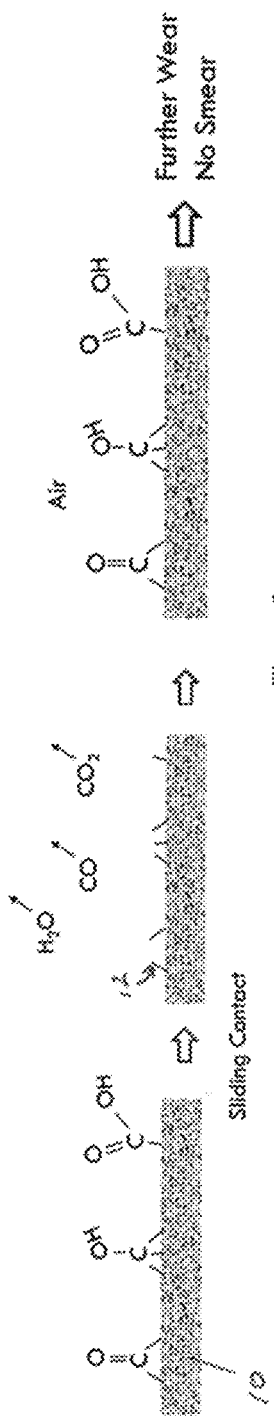
FIGS. 2A, 2B, and 2C are schematic depictions of an amorphous carbon surface with non-carbon moieties present at the surface, during use, in various gaseous atmospheres.
Figure 2B:
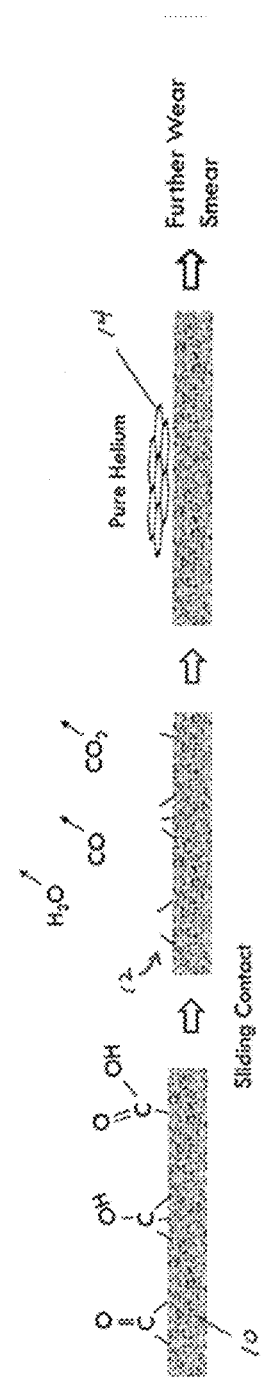
Figure 2C:
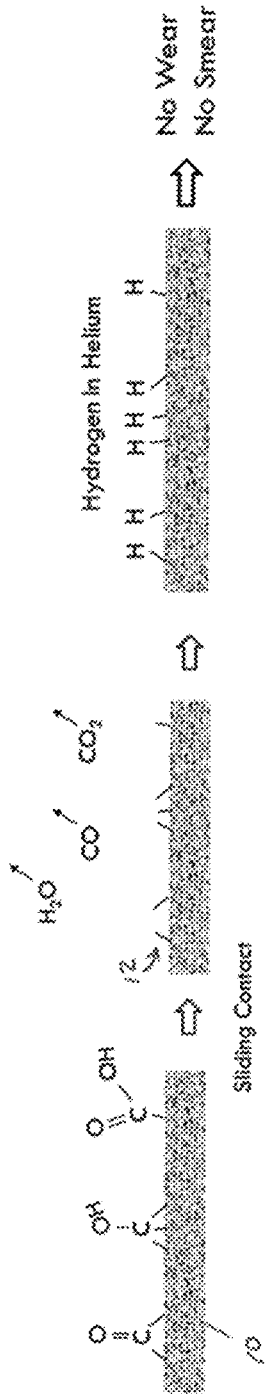

FIGS. 2A, 2B, and 2C schematically illustrate potential chemical interactions that may occur during use of hard disk drives that contain an amorphous carbon coating at a recording media surface, magnetic head, or both, in the presence of different types of gaseous atmospheres. Each figure shows amorphous carbon surface 10 at a surface of a hard disk drive or magnetic head (neither of which is shown). Surface 10 initially includes locations at which one or more non-carbon moieties such as a carbonyl moiety, a hydroxy moiety, and a carboxylate moiety are attached to carbon atoms at the amorphous carbon surface. During use of a hard disk drive that includes surface 10, during which an amount of incidental sliding contact occurs between a surface of a magnetic head and a surface of a magnetic recording medium, either or both of which include an amorphous carbon coating (10), the non-carbon moieties can be removed from the surface of amorphous carbon coating 10 to leave behind carbon dangling bonds 12.

Referring to FIG. 2A, amorphous carbon coating 10 is contained in an air atmosphere, which contains amounts of water vapor and oxygen. The water vapor and the oxygen in the atmosphere are available to react with the carbon dangling bonds to re-form one or more of a carbonyl moiety, hydroxy moiety, and carboxylate moiety at the dangling bonds 12, to passivate the surface, i.e., stabilize the surface, inhibit or prevent the formation of carbonaceous graphitic debris derived from surface 10, and prevent additional chemical wear or damage at the surface.

Referring to FIG. 2B, amorphous carbon coating 10 is contained in a helium atmosphere, which does not contain any significant amount of water vapor or oxygen or other gaseous compound that is effective to passivate carbon dangling bonds 12. After carbon dangling bonds 12 are formed at surface 10, the bonds are not passivated and remain at the surface where one carbon dangling bond can associate with another nearby carbon dangling bond, and where groups of carbon dangling bonds can associate together to form carbonaceous graphitic debris 14. During ongoing use, surface 10 suffers chemical wear and damage as carbon dangling bonds 12 continue to form, as groups of carbon atoms with carbon dangling bonds become associated to form graphitic debris 14, and as the carbon atoms associated with the carbon dangling bonds thereby are removed from surface 10 as graphitic debris 14. The graphitic debris 14 that forms will accumulate over time and will eventually become capable of causing reduced performance and reliability of the hard disk drive in which the debris is contained, including in the form of increased recording or reading errors.

Referring to FIG. 2C, amorphous carbon coating 10 is contained in a concentrated helium atmosphere that additionally contains a small amount of passivating gas, shown as hydrogen ($H_2$), in amount that is effective to passivate carbon dangling bonds 12. After carbon dangling bonds 12 are formed at surface 10, the bonds are passivated by the gaseous hydrogen to form comparatively stable carbon-hydrogen bonds at surface 10. The presence of the significantly-stable carbon-bonded hydrogen atoms at the surface inhibits or prevents the formation of carbonaceous graphitic debris derived from surface 10, and inhibits chemical wear or damage at the surface. To the extent that carbonaceous graphitic debris may eventually form at a media surface or magnetic head surface during extended use of the hard disk drive, the gaseous hydrogen in the disk drive atmosphere is capable of reacting with the graphitic debris to form a volatile reaction product such as methane that separates from surface 10 and becomes part of the gaseous atmosphere within the hard disk drive as a volatile (gaseous) molecule.

Gaseous hydrogen as a passivating gas, as exemplified at FIG. 2C, can be a particularly useful passivating gas. Because the reactivity of carbon dangling bonds is high, a relatively small amount of hydrogen (e.g., from 0.1 to 5 percent by volume, based on total atmospheric gas within a sealed hard disk drive) can be effective to achieve a useful degree of chemical surface passivation without risking flammability due to the hydrogen. Also, the kinetic diameter of a gaseous hydrogen ($H_2$) molecule is slightly larger than that of a helium atom, and the gaseous hydrogen is not likely to create an increased risk of diffusion or leaking from the hard disk drive interior.

In addition, as a secondary effect of hydrogen as a passivating gas (particularly in hard disk drives that experience elevated operating temperatures such as HAMR drives), gaseous hydrogen is capable of reacting with a graphitic carbonaceous material that may form or accumulate at a hard disk drive interior, especially at an elevated temperature (as will be present during operation of a HAMR drive), to convert the graphitic debris into a gaseous hydrocarbon. In specific, hydrogen is capable reacting with graphitic carbonaceous material, at a high temperature, to produce a volatile hydrocarbon compound such as gaseous (volatile) methane. Carbonaceous debris, to the extent that this is formed at a surface of a hard disk drive, particularly a high temperature surface such as a magnetic head of a HAMR disk drive, can be chemically converted by reaction with the gaseous hydrogen to form a gaseous, volatile hydrocarbon reaction product that disperses within the interior gaseous atmosphere. The volatile gaseous hydrocarbon exhibits significantly reduced potential to interfere with the performance of the hard disk drive compared to the solid graphitic carbonaceous material.

Example hard disk drives as described include those that operate using a heat-assisted magnetic recording (HAMR) mechanism, also sometimes referred to as thermal-assisted magnetic recording (TAMR) or energy assisted magnetic recording (EAMR). The HAMR recording process starts by heating a small region of a magnetic recording disk to a temperature that is above a Curie temperature (Tc) using a laser-powered near-field plasmonic transducer, which can raise temperatures for certain components in the disk drive to temperatures in a range from 350 to 450° C. Nearby structures such as a peg of a transducer of the magnetic head also reach this temperature.

Figure 3A:
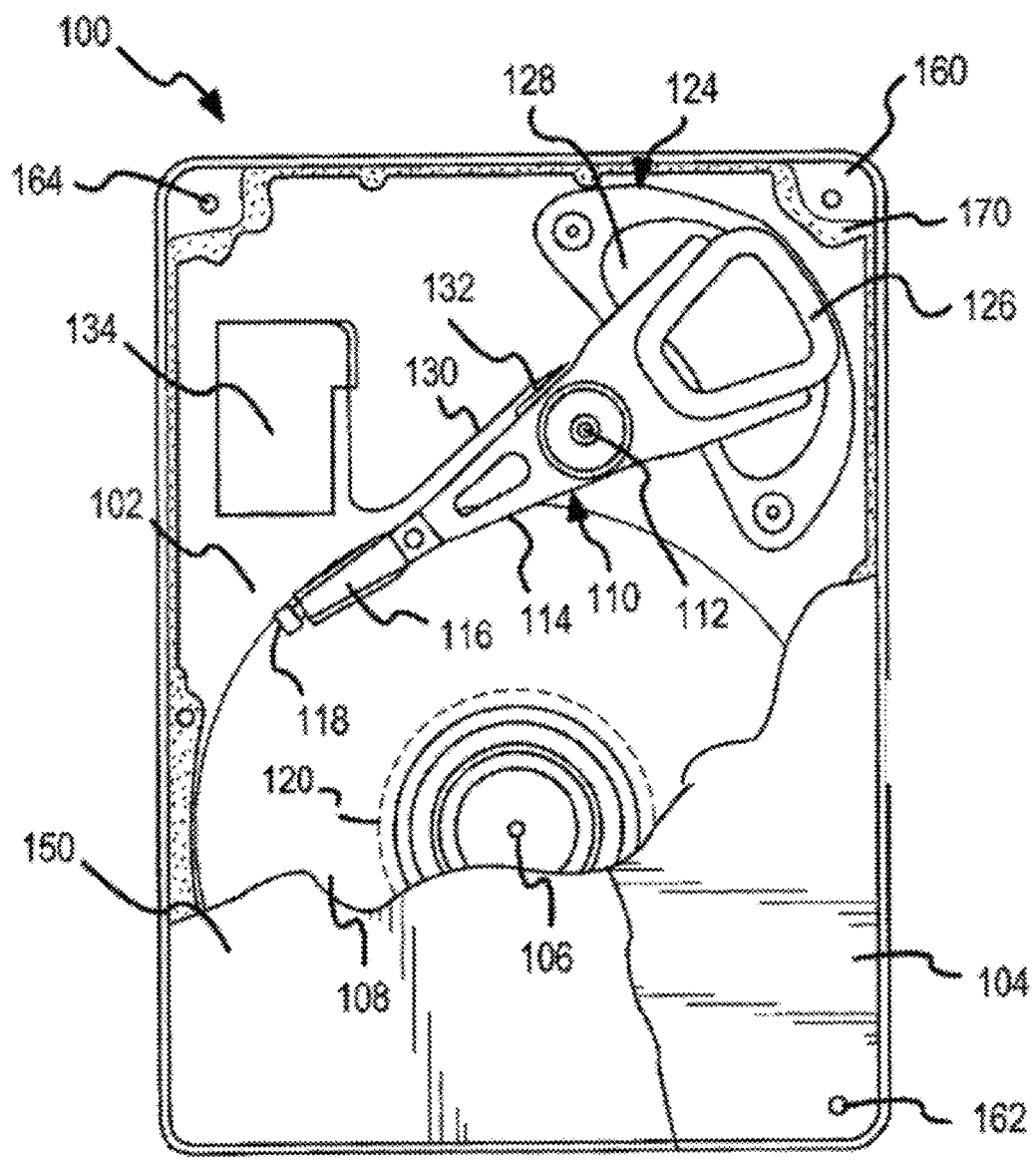
FIG. 3A shows a top, partial cut-away of a hard disk drive as described.

Illustrated at FIG. 3A is hard disk drive 100, which may be configured for heat-assisted magnetic recording, perpendicular magnetic recording, etc.

Disk drive 100 includes base 102 to which various components of the disk drive are mounted. A first structural cover 104, shown partially cut away, cooperates with base 102 to form a housing that defines an internal environment for the disk drive. The drive components include spindle motor 106, which rotates one or more disks 108 at a constant high speed. Information is written to and read from tracks on disks 108 through the use of actuator assembly 110, which rotates during operation about a bearing shaft assembly 112 positioned adjacent to disks 108. Actuator assembly 110 includes a plurality of actuator arms 114 which extend towards disks 108, with one or more flexures 116 extending from each of actuator arms 114. Mounted at a distal end of each flexure 116 is a magnetic (e.g., read/write) head 118. Head 118 includes a slider to cause and enable the head to be suspended above (i.e., to "fly" over) and in close proximity to a corresponding surface of an associated disk 108.

During operation, a track position of each head 118 is controlled through the use of voice coil motor 124, which typically includes a coil 126 attached to actuator assembly 110, as well as one or more permanent magnets 128, which establish a magnetic field in which the coil 126 is immersed. The controlled application of current to coil 126 causes magnetic interaction between the permanent magnets 128 and the coil 126 so that coil 126 moves in accordance with the well-known Lorentz relationship. As coil 126 moves, actuator assembly 110 pivots about bearing shaft assembly 112 and heads 118 are caused to move relative to surfaces of disks 108.

A flex assembly 130 provides the requisite electrical connection paths for actuator assembly 110, while allowing pivotal movement of actuator assembly 110 during operation. The flex assembly includes a printed circuit board 132 to which head wires (not shown) are connected, the head wires being routed along actuator arms 114 and flexures 116 to heads 118. The printed circuit board 132 typically includes circuitry for controlling the write currents applied to the heads 118 during a write operation and a preamplifier for amplifying read signals generated by heads 118 during a read operation. The flex assembly terminates at flex bracket 134 for communication through base deck 102 to a disk drive printed circuit board mounted to the bottom side of disk drive 100.

Figure 3B:
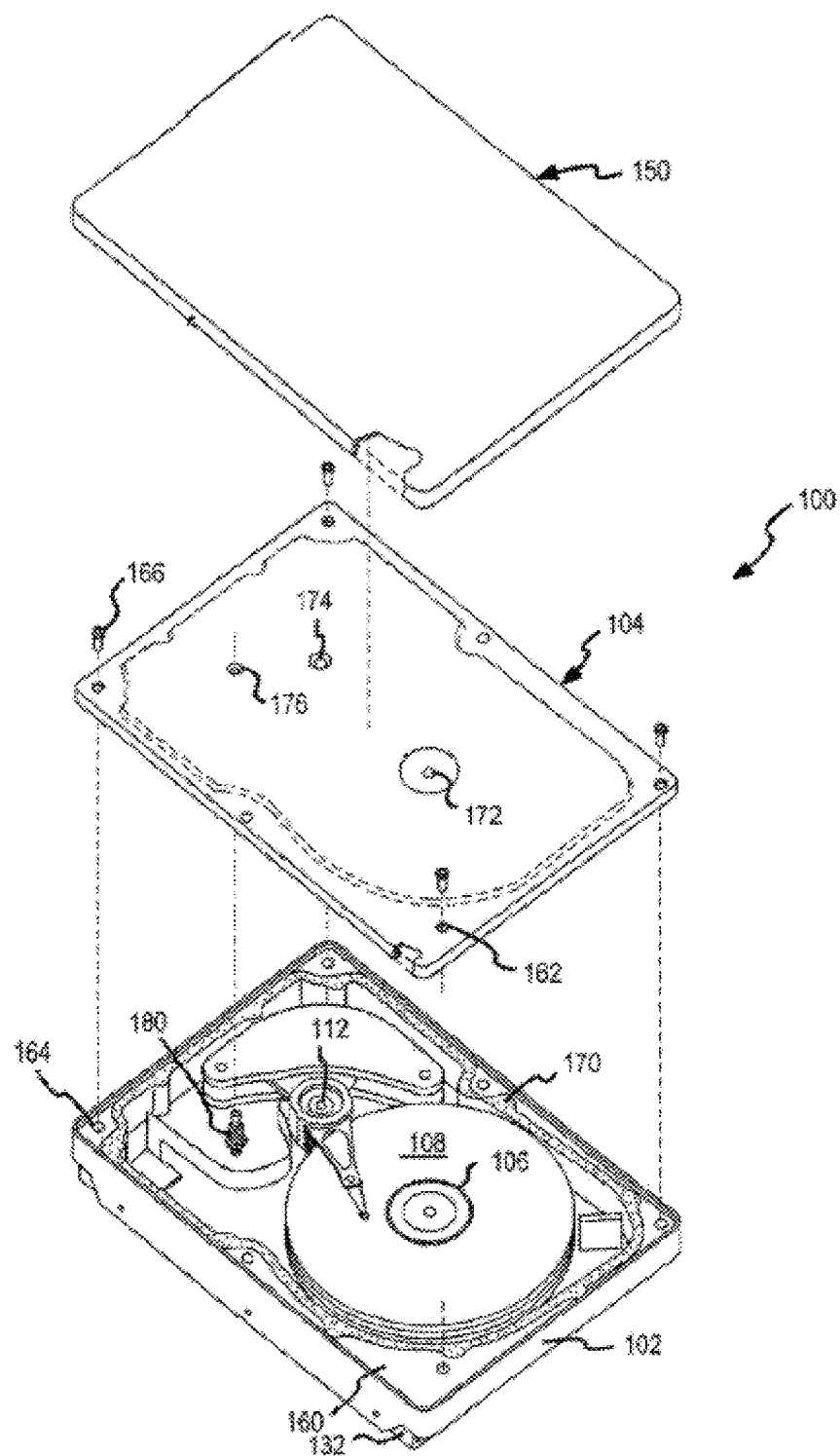
FIG. 3B shows an exploded view of a hard disk drive as described.

FIGS. 3A and 3B further illustrate a second, sealing cover 150 secured over the top of the first structural cover 104. The use of the second sealing cover 150 in combination with the structural cover 104 provides a seal that prevents the atmospheric gas at the interior of sealed hard disk drive 100 from leaking out during a service lifetime of the drive.

FIG. 3B is an exploded view of disk drive 100 and covers 104 and 150. It is noted that base 102 includes a raised contact surface or shoulder 160 that extends around a perimeter of base deck 102 to provide a mating surface for a perimeter of structural cover 104.

Prior to screwing the cover 104 to the base deck 102, a seal 170 is preferably placed on one of the raised shoulder 160 of the base 102 or the underside perimeter of the cover 104. As illustrated at FIG. 3B, a continuous rubber gasket seal 170 is positioned around the perimeter of raised shoulder 160 so that the seal 170 engages the bottom surface of the cover 104 to seal the internal environment of disk drive 100 against contaminants.

FIG. 3B further illustrates that structural cover 104 preferably provides structural support for spindle motor 106 and bearing shaft assembly 112 of the disk drive 100. Specifically, cover 104 includes countersunk openings 172 and 174 that correspond to spindle motor 106 and bearing shaft assembly 112, respectively. The inclusion of the openings 172 and 174 allows structural cover 104 to stabilize the spindle motor 106 and the actuator assembly 110.

FIG. 3B also illustrates a location for a fill port 176 within the structural cover 104. Example fill port 176 of FIG. 3B retains one end of a gas valve 180, such as a Schrader valve, while the opposite end of the valve 180 extends into the internal environment of the disk drive 100. Because valve 180 extends downward from cover 104, fill port 176 is preferably located over a portion of base deck 102 that does not contain either disks 108 or actuator assembly 110.

In the instance of disk drive 100 being configured as a HAMR drive, the system records information bits in a storage layer of a disk 108 of a specially configured magnetic media, while the storage layer is heated to an elevated temperature. The heat is capable of overcoming superparamagnetic effects that might otherwise limit the areal data density of the media. To provide useful heating, example HAMR devices typically include a near field transducers (NFT) that includes a small "peg" that is used to deliver electromagnetic energy to a confined area of a rotating magnetic recording disk. The area (spot size) that is exposed to the electromagnetic energy is heated at the same time that the magnetic write head applies a magnetic field to the media for recording.

A HAMR read/write component, sometimes referred to as a slider, recording head, read head, write head, read/write head, etc., includes magnetic read and write transducers that have microelectronic components that are of the same function as those on other types of hard drive read/write components. For example, data may be read by a magnetoresistive sensor that detects magnetic fluctuations of a magnetic media as the media moves underneath the sensor. Data is written to the magnetic media by a write coil that is magnetically coupled to a write pole. The write pole changes magnetic orientation in regions of the media as the media moves underneath the write pole in response to an energizing current applied to the write coil. A HAMR slider will also generally include a source of energy, such as a laser diode, to heat the media while the write pole writes to the media. An optical delivery path is integrated into the HAMR slider to deliver the energy to the surface of the media.

The optical delivery path of a HAMR slider may include a plasmonic transducer proximate a media-facing surface (e.g., air-bearing surface, contact surface). The plasmonic transducer shapes and transmits the energy to a small region on the medium. The plasmonic transducer is sometimes referred to as a near-field transducer (NFT), optical antenna, surface plasmon resonator, etc., and may include a plasmonic metal such as gold, silver, copper, aluminum, etc., and alloys thereof. The plasmonic transducer for a HAMR device is very small (e.g., on the order of 0.1 to a few light wavelengths, or any value therebetween) and creates a localized region of high power density in the media through an electromagnetic interaction. This produces a rapid and large temperature increase at a small area of the media surface, with the region exceeding the Curie temperature having dimensions less than 100 nm.

While this description includes specific information relating to features of a HAMR disk drive, the present description is not limited to any particular disk drive read-write mechanism, and can be useful with other mechanisms such as perpendicular magnetic recording (PMR) mechanisms that do not involve a heat-assisted magnetic recording mechanism. See, e.g., United States Patent Application Publication 2006/0256471, the entirety of which is incorporated herein by reference.

The invention claimed is:

1. A hard disk drive comprising:
   a sealed enclosure,
   a magnetic recording device disposed within the enclosure, the device comprising:
      a magnetic recording medium surface,
      a magnetic head, and
      an amorphous carbon surface,
   a low density atmosphere within the enclosure, the atmosphere comprising a low density gas and passivating gas, the passivating gas being present in an amount up to 5 percent (by volume), the passivating gas being effective to passivate carbon dangling bonds that form at the amorphous carbon surface during use of the hard disk drive,
   wherein the passivating gas is a derivative of a room temperature-gaseous hydrocarbon, the derivative comprising an alcohol, aldehyde, carboxylic acid, ketone, fluoride, or chloride.

2. The hard disk drive of claim 1 wherein the magnetic head is a heat assisted magnetic recording head that comprises:
   a near-field transducer comprising a peg,
   an optical waveguide configured to couple light from a light source to the near-field transducer.

3. The hard disk drive of claim 1 wherein the magnetic head is a perpendicular magnetic recording head that comprises a ferromagnetic core comprising a first pole and a second pole, and a conductive coil inductively coupled to the core.

4. The hard disk drive of claim 1 wherein the magnetic head comprises an amorphous carbon coating.

5. The hard disk drive of claim 1 wherein the magnetic recording medium surface comprises an amorphous carbon coating.

6. The hard disk drive of claim 1 wherein the amorphous carbon surface comprises diamond-like carbon.

7. The hard disk drive of claim 1 wherein the low density gas is helium.

8. The hard disk drive of claim 1 wherein the atmosphere comprises from 0.1 to 5 volume percent passivating gas.

9. The hard disk drive of claim 1 wherein the atmosphere comprises from 0.2 to 4 volume percent passivating gas.

10. The hard disk drive of claim 1 wherein the atmosphere comprises helium and from 0.1 to 5 volume percent hydrogen.

11. The hard disk drive of claim 1 wherein the atmosphere consists of helium and from 0.1 to 5 volume percent hydrogen.

12. A method of using a hard disk drive of claim 1, the method comprising:
   writing data magnetically to the magnetic recording medium surface using the magnetic head, and
   reading the data using the magnetic head.

13. The method of claim 12, wherein during use of the hard disk drive:

carbon dangling bonds form at the amorphous carbon surface, and the passivating gas comprises hydrogen, which passivates carbon dangling bonds by forming a carbon-hydrogen bond at the carbon dangling bonds.

14. The method of claim 12 wherein the low density gas is helium.

15. A method of assembling a hard disk drive, the method comprising:
to a hard disk drive comprising:
a sealed enclosure,
a magnetic recording device disposed within the enclosure, the device comprising:
a magnetic recording media surface,
a magnetic head, and
an amorphous carbon surface,
adding a gaseous low density atmosphere to the enclosure, the gaseous low density atmosphere comprising a low density gas and passivating gas, the passivating gas being present in an amount up to 5 percent (by volume), the passivating gas being effective to passivate carbon dangling bonds that can be produced at the amorphous carbon surface during use of the hard disk drive
wherein the passivating gas is a derivative of a room temperature-gaseous hydrocarbon, the derivative comprising an alcohol, aldehyde, carboxylic acid, ketone, fluoride, or chloride.

16. The method of claim 15 wherein the magnetic head is a heat assisted magnetic recording head that comprises:
a near-field transducer,
an optical waveguide configured to couple light from a light source to the near-field transducer.

17. The method of claim 16 wherein the near-field transducer reaches a temperature in a range of from 350 degrees Celsius to 450 degrees Celsius.

* * * * *